United States Patent [19]
Koether et al.

[11] Patent Number: 5,542,344
[45] Date of Patent: Aug. 6, 1996

[54] SOUS VIDE RETHERMALIZER

[75] Inventors: Bernard G. Koether, Tequesta, Fla.;
Paul D. Scott, Farmington, Conn.

[73] Assignee: Technology Licensing Corporation, Tequesta, Fla.

[21] Appl. No.: 39,615

[22] Filed: Mar. 30, 1993

[51] Int. Cl.⁶ .............................. A47J 27/62; A47J 27/00
[52] U.S. Cl. .................. 99/330; 99/333; 99/403; 99/468; 99/483; 392/445; 392/447
[58] Field of Search ........................ 99/330, 331, 332, 99/333, 468, 325, 483, 486, 403, 404, 405, 406, 407, 409; 219/441, 442, 438, 492,494, 497, 437, 417, 416; 392/444, 445, 447, 449

[56] References Cited

U.S. PATENT DOCUMENTS

| | | | |
|---|---|---|---|
| 4,489,235 | 12/1984 | Porteous | 219/417 |
| 4,812,625 | 3/1989 | Ceste, Sr. | 99/330 |
| 5,060,560 | 10/1991 | VanDeMark | 99/330 |
| 5,090,305 | 2/1992 | Lehman | 99/330 |
| 5,097,759 | 3/1992 | Vilgrain et al. | 99/483 |
| 5,103,801 | 4/1992 | Herring et al. | 99/330 |
| 5,186,097 | 2/1993 | Vaseloff et al. | 99/330 |

*Primary Examiner*—David Scherbel
*Assistant Examiner*—Reginald L. Alexander
*Attorney, Agent, or Firm*—Pennie & Edmonds

[57] ABSTRACT

A control system for a rethermalization appliance including one or more vats for containing water wherein the system enables designation of vat function and control of the water level in the vat(s). An input device enables the appliance operator to designate each vat function as desired. A timing and memory unit retrieves set point temperatures corresponding to the vat functions designated. Temperature controllers control the temperature of the water level in the vats based on the set point temperatures received from the timing and memory unit. Water level controllers receive input from sensors in the vats indicating low and full water levels. The water level controllers further receive input from associated temperature controllers indicating if the water temperature for that particular vat is within a predetermined range of the set point. Input to the water level controllers is also provided by the timing and memory unit to determine whether the associated vat is in an active finishing cycle. If a low water level is detected by a water level controller, water is automatically added to the vat when the water temperature in the vat is within the predetermined range of the set point and when the vat is not in an active finishing cycle.

17 Claims, 3 Drawing Sheets

SOUS VIDE RETHERMALIZER

The invention relates to rethermalization appliances, and, in particular, to a system for designating a vat function and for controlling the water level in a sous vide rethermalizer.

BACKGROUND OF THE INVENTION

Sous vide ("under vacuum") food preparation techniques are becoming increasingly popular in the food service and restaurant industries. With sous vide food preparation, restaurants or other food service establishments are able to serve a wide selection of high quality, gourmet food items with minimal on-site cooking and preparation.

In the sous vide process, food and spices are contained in thermo-retractable pouches which are evacuated and sealed. Typically the food is placed in the pouches at a factory location remote from the food service establishment. The sealed pouches are then slowly cooked in the factory at low temperatures to enhance flavor and texture. The pouches are then flash frozen and shipped to the restaurants and food service establishments.

The frozen pouches arriving at the food service establishment are stored until the food is to be served. At this time, the pouches are placed in a sous vide rethermalization appliance. The appliance typically contains one or more water containment tanks or vats. In accordance with the sous vide process, a pouch to be reheated is placed in a first vat and heated to bring the internal temperature of the food to approximately 180° F. Immediately prior to serving the food, the pouch is placed in a second vat and heated for a predetermined time at approximately 200° F. The exact temperatures of course, depend upon the type and texture of the food being heated. After the food is cooked, the pouch is removed from the vat, opened, and the food transferred to a plate for serving.

Such a device for reheating sous vide food pouches is disclosed in U.S. Pat. No. 5,097,759 entitled "Sous Vide Reheating Device" and issued to Vilgrain et al. The device includes first and second water heating chambers, each including an electrical heating element and a thermostat to control the temperature of the water therein. The first chamber is arranged to preheat sous vide pouches and has a water bath which is maintained at a first predetermined temperature preferably of about 135° F. to about 140° F. The second chamber is arranged to quickly heat the sous vide pouches immediately prior to serving and has a water bath which is maintained at a second predetermined temperature preferably between 160° F. to about 165° F.

A timer control unit is provided above each unit. Each timer control unit receives a signal from the thermostat indicating the temperature of the water in the chamber and varies the time for each pouch depending upon the difference between the actual temperature of the water and the predetermined temperature. Each chamber is preferably divided into a plurality of sub-chambers with each sub-chamber having an associated timer to measure the amount of time elapsed for that sub-chamber.

Water level changes in the rethermalizer are primarily due to insertion and removal of bags in the vats. The precise water level is often difficult to determine by visual inspection alone as dividers commonly used to separate numerous pouches in the vats obstruct the view of the operator. Visual water level monitoring also requires substantial time and effort by the system operator.

SUMMARY OF THE INVENTION

The present invention provides a system for designating a vat function and for controlling the addition of water in a sous vide rethermalizer. The rethermalizer includes one or more vats for containing a supply of water. An input device is provided to enable the appliance operator to enter the desired vat function in response to prompts from a display unit. A timing and memory unit stores set point temperature information and is responsive to the desired vat function, i.e., appropriate set point temperature, selected by the operator to select the appropriate set point temperature for that function. The set point selected by the timing and memory unit is output to a temperature controller. The temperature controller then controls the temperature of the water contained in the vat in accordance with the set point temperature received from the timing and memory unit. In this manner, the vat function can be designated by the operator depending on kitchen orientation or may be re-designated in the event of product failure.

The timing and memory unit further outputs a signal indicative of whether the vat is in an active finishing cycle. This signal is received by a water level controller. The water level controller further receives a signal from the temperature controller indicative of whether the temperature of the water in the vat is within a predetermined range of the set point temperature.

Sensors are provided in the vat to indicate low and full water levels. The sensor outputs are connected to the water level controller. When a low water level is detected, the controller adds water to the vat if the water temperature is within the predetermined range of the set point temperature and if the vat is not in an active finishing cycle. Water is added until the controller detects a full water level in the vat. Thus, the vat is continuously monitored for low water levels. Further, when a low water level is detected, the system of the present invention ensures that water is added at the optimum time, i.e., when the water temperature is near the set point and when no finishing processes are occurring. Thus, the system prevents cold water from suddenly lowering the water temperature below the set point temperature, thereby damaging the rethermalization process. In addition, the system requires minimal effort by the operator.

DETAILED DESCRIPTION OF THE INVENTION

Figure 1:
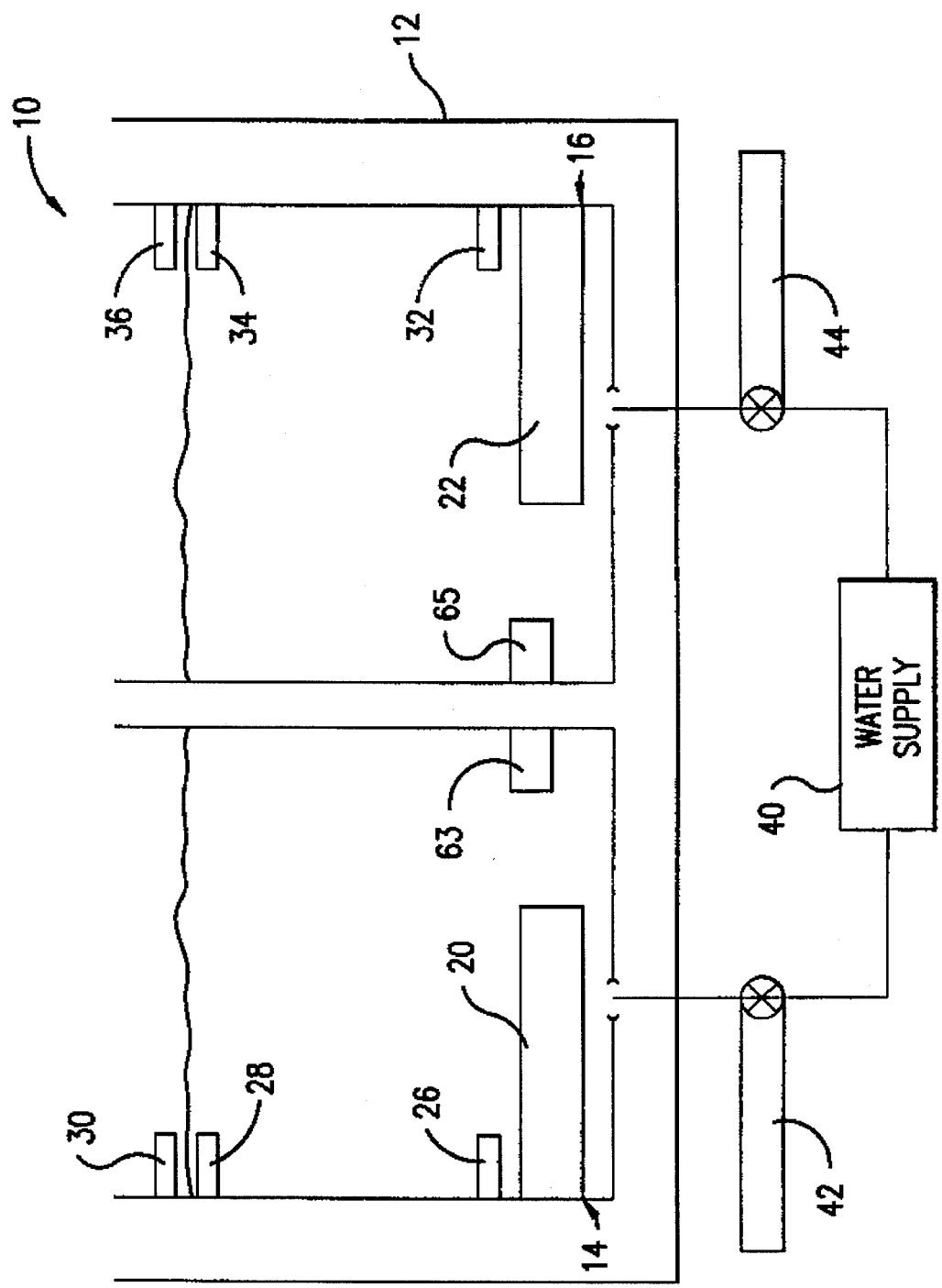
FIG. 1 is a schematic side cross-sectional view of a sous vide rethermalization appliance.

FIG. 1 schematically illustrates a cross-sectional side view of a rethermalization appliance 10 for reheating and finishing food pouches prepared in accordance with sous vide cooking techniques. The rethermalizer 10 comprises a housing 12 including first and second chambers 14, 16 for holding water. The first chamber 14 comprises a holding tank or vat utilized for heating sous vide pouches to a temperature of approximately 140° F. The second chamber 16 comprises a finishing tank or vat in which sous vide pouches are cooked for a short time period at approximately 180° F. to complete cooking of the food contained within the pouches prior to serving. As will be explained in more detail below, the rethermalization function, i.e., holding or finishing, of the first and second vats 14, 16 may be re-designated by the operator as desired.

Heating means are provided in the form of electrical heating elements 20, 22 to heat each tank 14, 16 to the respective desired temperature. Such heating elements are well known in the art. Alternatively, gas heating elements also may be used, as are well known in the art. Each vat 14, 16 further includes a plurality of water level sensors attached to a side wall of each vat. The sensors are mounted so that the water level in the vats 14, 16 never falls below the heating elements 20, 22 nor rises enough to overflow when sous vide food pouches are placed in the vats. In the first or left vat 14, a first water level sensor 26 is mounted near the bottom of the vat. Second and third water level sensors 28, 30 are mounted near the top of the vat 14, approximately one-half inch apart. The second or right vat 16 similarly includes a first water level sensor 32 mounted near the bottom surface of the vat, and second and third water level sensors 34, 36 mounted near the top of the vat 16, approximately one-half inch apart. Preferably, the first level sensors 26, 32 are mounted approximately 4.25" above the bottom surface of the vats 14, 16, respectively, and the second and third level sensors 28, 34 and 30, 36 are mounted approximately 7.75" and 8.75" above the bottom surface of the vats 14, 16, respectively.

In each vat, the first water level sensor 26, 32 determines whether the water in the vat is above a critical level. When water in either vat 14, 16 is below this critical level, the heating means 20, 22 is disabled to prevent overheating and resulting damage to the rethermalizer 10. The second water level sensor determines whether water needs to be added to the vat, while the third sensor indicates when water in the vat is at a full level. All three water level sensors preferably comprise resistive sensing elements as well known in the art, such as nylon insulated stainless steel rods used in conjunction with an AC current to sense the low conductivity of the water in the vat, although other types of suitable sensing elements could also be used. A water supply 40 is connected to the left vat 14 in a conventional manner through a first valve 42 and to the right vat 16 through a second valve 44 to supply water to the vats when indicated by the level sensors. Preferably, the valves comprise solenoid actuated valves. Those skilled in the art will recognize, however, that other valve types could be used as well. The water level control process will be explained in further detail below.

Figure 2:
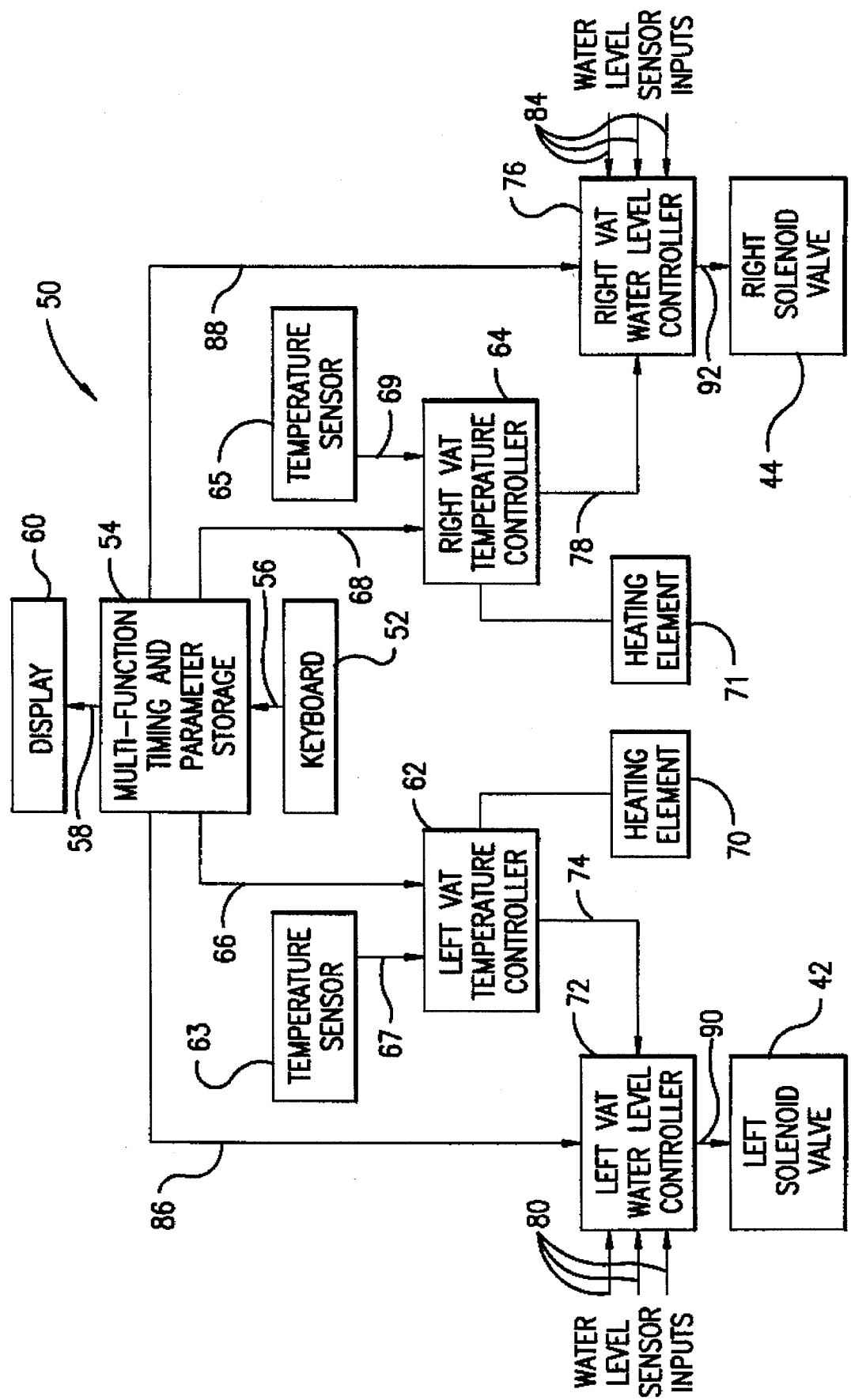
FIG. 2 is a block diagram of a water level control system for a vat in accordance with the present invention.

A block diagram of a vat designation and water level control system 50 for the rethermalizer 10 is shown in FIG. 2. The system 50 includes an input device 52, such as an alpha-numeric keyboard, which is used to input temperature and timing information into the system. The keyboard 52 is connected to a multi-function timing and parameter storage device 54 via a signal line 56.

The timing/parameter storage device 54 monitors and controls the timing of the holding and finishing processes carried out by the rethermalization appliance 10 in accordance with conventional techniques. Preferably, the timing device 54 includes a processing unit including memory which stores a plurality of preset time values for various sous vide food pouches which are selected by the operator via the keyboard 52. The timing device 54 further preferably includes a plurality of timers corresponding to the number of holding and finishing areas which may be formed by perforate walls, which allow the water in the vat to flow freely therethrough, placed perpendicularly in the vat to form the desired number of holding/finishing areas therein. The timing/parameter storage device 54 is connected via a signal line 58 to a display unit 60 which displays timing information as well as operator prompts initiated by the system as will be explained hereinafter. In addition, the timing device 54 may include visual or audio indications to indicate which timers are currently active and the elapse of holding/finishing time for a particular timer. A preferred timer incorporating these functions is available from Food Automation—Service Techniques, Inc., or (FAST.)®, of Stratford, Conn. as the (FASTRON.)® Food Processing Computer.

The timing and parameter storage device 54 is further connected to a first or left temperature controller 62 and a second or right temperature controller 64 via signal lines 66 and 68, respectively. The left temperature controller 62 is connected to a first or left water level controller 72 via a signal line 74. Similarly, the right temperature controller 64 is connected to a second or right water level controller 76 via a signal line 78. The temperature controllers 62, 64 output signals to the heating elements 70 and 71 on signal lines 77 and 79, respectively, to control the operation of the heating elements, thereby controlling the temperature of the water contained in the vats 14, 16.

The left water level controller 72 receives inputs from the water level sensors 26, 28, 30 mounted in the left vat 14 on signal lines generally designated 80, while the right water level controller 76 receives inputs from the water level sensors 32, 34, 36 mounted in the right vat 16 on signal lines generally designated 84. The water level controllers 72, 76, further receive an input signal from the timing/parameter storage device 54 via signal lines 86 and 88, respectively. The left water level controller 72 outputs a signal to the left solenoid valve 42 on a signal line 90. Similarly, the right water level controller 76 outputs a signal to the right solenoid valve 44 on a signal line 92.

In accordance with one aspect of the invention, the timing/parameter storage device 54 further includes a lookup table stored in memory where information regarding the vat function and the set point temperatures is stored. With the system of the present invention, the operator of the rethermalization appliance can advantageously designate the vats 14, 16 as holding or finishing vats on-site. To designate the function of the vats 14, 16, the operator depresses a function key or a programmed series of keys on the keyboard 52 to initiate the designation process. The initiation signal is sent by the keyboard 52 to the timing/parameter storage device 54 over the signal line 56. In response to this signal from the keyboard 52, the timing/parameter storage device 54 generates a first query signal which is sent to the display 60 over the signal line 58 resulting in a visual prompt to enter the desired rethermalization function of the left vat 14, i.e., holding or finishing. The operator then enters the desired function of the left vat 14 on the keyboard 52 in response to this prompt from the timing/parameter storage device 54.

Once the desired rethermalization function of the left vat 14 has been entered and set by the operator, the timing/parameter storage device 54 generates a second query signal which is sent to the display 60 via the signal line 58 to prompt the operator to enter the desired function of the right vat 16. The desired function of the right vat is similarly input to the timing/parameter storage device 54 over the signal line 56 by the operator via the keyboard 52 to designate the function of the right vat 16. Alternatively, the system may be configured such that the timing/parameter storage device generates a query signal to the display to prompt the operator to enter the desired function of one of the vats, left or right, after which the function of the other vat is automatically recognized to be the alternative of that entered by the operator, i.e., if a holding function was designated by the operator for the right vat, the timing/parameter storage device automatically designates the left vat as the finishing vat.

After the desired vat functions have been entered by the operator, the timing/parameter storage device 54 retrieves the set point temperatures stored in the lookup table for the vat function configuration that has been entered. The set point temperature for each vat is then sent to its associated temperature controller. In particular, the set point temperature corresponding to the function entered for the left vat 14 is transmitted to the left vat temperature controller 62 via the signal line 66 and the set point temperature corresponding to the function entered for the right vat 16 is transmitted to the right vat temperature controller 64 via the signal line 68.

In this manner, the appliance operator may designate the vat function, i.e., holding or finishing, on-site in accordance with the kitchen configuration and the individual needs of the food service establishment. In addition, should one of the vats fail, the present invention enables re-designation of the operating vat in an efficient manner.

The timing parameter storage device 54 may further be used by a food server in a restaurant setting to store identification and/or table number data entered via the keyboard 52 and signal line 54 to monitor preparation of meals for individual tables or customers. The data entered via the keyboard 52 could be displayed on the display unit 60 automatically in connection with an alarm signalling the end of the rethermalizing cycle for the food, or in response to a command entered via the keyboard so that food servers may further monitor the progress of the meal preparation.

Those skilled in the art will recognize that although a rethermalizer comprising two vats has been illustrated, the invention would also apply to rethermalization appliances having any number of individual vats. For example, banquet facilities which typically serve two or three entrees in large quantities might use a rethermalization appliance having at least four vats. The present invention enables the operator of such a multi-vat system to designate the function for each vat on-site in accordance with kitchen design and the needs of the restaurant to facilitate sous vide food preparation. Further, if one or more of the vats is subject to product failure, the vat functions may be re-designated in a time efficient and cost effective manner with little effort by the operator.

The set point temperatures received by the temperature controllers 62, 64 are stored for use in conventional temperature control and monitoring processes. Temperature sensors 63, 65 are mounted within each vat 14, 16 as well known in the art and provide output signals indicating the temperature of the water in the vats to the temperature controllers 62, 64 over signal lines 67 and 69, respectively. The temperature controllers 62, 64 control the temperature of the vats 14, 16 based on the set point temperatures received from the timing/parameter storage device 54, operating the heating elements 70, 71 associated with the vats to heat the water contained therein as necessary. The set point temperature for a holding vat is approximately 140° F., while the set point temperature for a finishing vat is approximately 180° F. In addition, as well known in the art, each temperature controller 62, 64 defines a small range or band of temperature preferably within 2° F. about the set point in which the water temperature is recognized as the desired or "ready" temperature. This temperature range is commonly selected in accordance with the amount of hysteresis in the temperature controllers 62, 64. Such a temperature controller, or thermostat, is described in U.S. Pat. No. 5,097,759 issued to Vilgrain et al., herein incorporated by reference.

Figure 3:
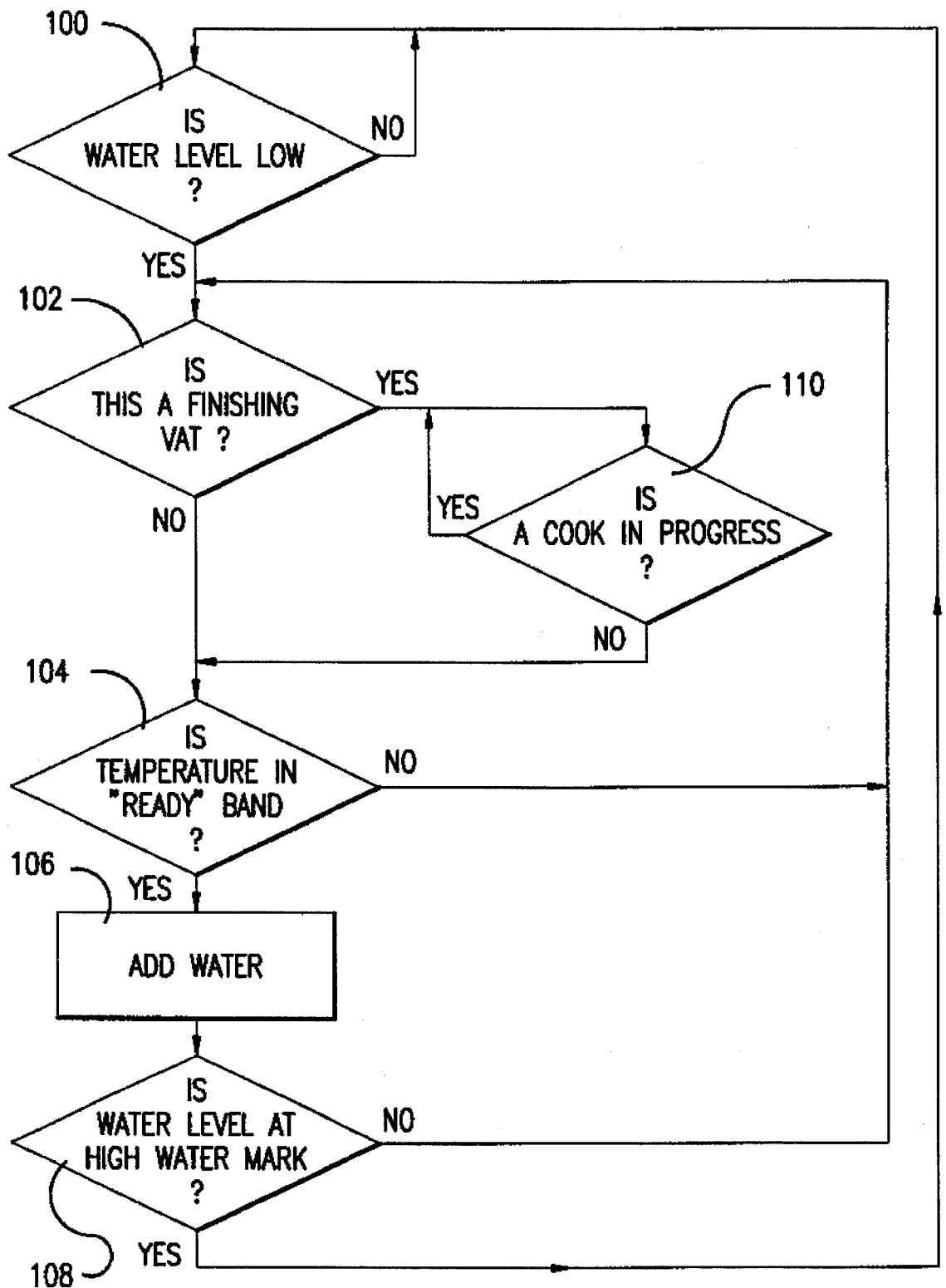
FIG. 3 is a flow diagram illustrating the water level control process.

Each water level controller 72, 76 operates in accordance with the water level control process illustrated in the flow diagram of FIG. 3. As previously described, input from the sensors 26, 28, 30 in the left vat 14 is received by the left vat water level controller 72 via the signal lines 80. Input from the sensors 32, 34, 36 in the right vat 16 is received by the right vat water level controller 76 via the signal lines 84.

The process flow diagram of FIG. 3 will now be explained in greater detail. While the operation of the water level control system of the present invention is discussed hereafter with reference to the left vat 14 and associated circuitry, it should be understood that the control system operates in an identical manner to monitor and control water levels in the right vat or other associated vats.

As represented by decision block 100, the left water level controller 72 continuously monitors the output of the second sensor 28 in the left vat 14 via the signal lines 80 to determine whether the water level in left vat is low. If a low water level signal is received from the sensor 28, the controller 72 then checks the signal received from the timing/parameter storage device 54 via the signal line 86. This signal indicates the vat function currently designated for the left vat. Thus, the signal indicates to the left water level controller 72 whether the left vat 14 is currently designated as a holding vat or a finishing vat. As depicted by decision block 102, the water level controller 72 checks the designation signal received from the timer/parameter storage device 54 to determine whether the left 14 is currently designated as a finishing vat.

If the vat is not currently designated as a finishing vat, i.e., the vat is designated as a holding vat, the controller 72 next checks to determine whether the temperature of the water contained in the vat is within the ready band as represented by decision block 104. This determination is made by the controller 72 by monitoring a portion of the signal output by the left temperature controller 62 via the signal line 74 which includes information regarding the temperature of the water stored in the vat.

Referring again to decision block 102, if the left vat 14 is currently designated a finishing vat, the left water level controller 72 checks to see if a finishing cycle, or cooking, is in progress, as depicted by decision block 110. A portion of the signal from the left vat temperature controller 62 input to the left vat water level controller 72 via the signal line 74 includes information indicating if one or more finishing processes is currently active to enable the left level controller 72 to make this determination. If at least one cooking cycle is in progress, the controller 72 monitors the input signal from the temperature controller 62 until the signal indicates the active cycle(s) has been completed and cooking is no longer in progress. When the controller 72 determines there is no finishing cycle currently in progress, it next determines whether the vat temperature is in the ready band as represented by decision block 104. As discussed above, this determination is made by evaluating the temperature portion of the signal input from the temperature controller 62 via the signal line 74.

If the temperature of the vat is not in the ready band, the controller returns to decision block 102 to again check the output of the timing/parameter storage device 54 to determine whether the vat is designated as a finishing vat. In this manner, the system ensures that the function of the vat is not redesignated and that pouches have not been placed in the vat for finishing while the water temperature rises to the ready band.

If the temperature of left vat 14 is within the ready band, the left level controller 72 outputs an add water output signal to the left solenoid valve 42 via the signal line 90 to admit water into the vat as represented by activity block 106. Water is added to the vat until the left level controller 72 determines that a "full" water level has been reached, indicated by decision block 108. This determination is made by monitoring the full water level output signal from the third water level sensor 30 in the left vat 14 via the signal lines 80.

If the water level has not reached the high water mark after the additional water has been supplied to the vat 14 as indicated by the output signal from the third sensor 30, the controller 62 returns to decision block 102 to determine whether the vat is a finishing vat, whether cooking is in progress, and whether the temperature of the vat is within the ready band. In this manner, water is not added to the vat when the temperature is out of the ready band or when the product is added into the vat for finishing.

If the output from the third level sensor 30 indicates the water level in the vat 14 is at a full level, the add water output signal to the valve 42 on signal line 90 is disabled and the left water level controller 72 again begins monitoring the output of the second sensor 28 on the signal line 80 to detect a low water condition as depicted by decision block 100.

The right vat 16 and corresponding circuitry components operate in an identical manner to that described above to monitor and control water level in the right vat. Thus, it can be seen that the system of the present invention provides intelligent control and monitoring of water levels in a sous vide appliance. Those skilled in the art will further recognize that the system of the present invention could easily be incorporated into single as well as multi-vat rethermalizers.

As will be apparent to those skilled in the art, various modifications and adaptations of the embodiments described above will become readily apparent without departure from the spirit and scope of the invention, the scope of which is defined in the appended claims.

What is claimed is:

1. A sous vide rethermalizer comprising:

a housing containing at least one vat for holding water;

means for selecting a vat function of said at least one vat from a selection of vat functions designed to heat sealed containers of pre-cooked food for serving;

a processing unit connected to said selecting means, wherein said processing unit selects a set point temperature associated with the selected vat function;

a temperature controller connected to said processing unit, wherein said temperature controller controls the temperature of said water in said at least one vat in accordance with said set point temperature; and data input means for entering data corresponding to food sever identification and customer location information.

2. The rethermalizer of claim 1, further comprising a display unit for displaying said data.

3. The rethermalizer of claim 1, wherein said means for selecting said vat function of said at least one vat comprises a keyboard.

4. The rethermalizer of claim 1, further comprising timing means for timing said vat function of said rethermalizer.

5. A sous vide rethermalizer comprising:

a housing containing at least one vat for holding water;

means for selecting a vat function of said at least one vat from a selection of vat functions designed to heat sealed containers of pre-cooked food for serving;

a processing unit connected to said selecting means, wherein said processing unit selects a set point temperature associated with the selected vat function;

a temperature controller connected to said processing unit, wherein said temperature controller controls the temperature of said water in said at least one vat in accordance with said set point temperature; and wherein said vat functions comprise a holding function in which sealed containers of pre-cooked food are heated at a first temperature and a finishing function in which said food is heated at a second temperature which is higher than said first temperature and is designed for use immediately prior to serving said food.

6. A system for controlling the level of water in a sous vide rethermalizer comprising:

a sous vide rethermalizer having at least one vat designed for holding and heating water in which sealed pouches of pre-cooked food are heated in preparation for serving;

a first sensor mounted in said at least one vat for detecting a low water level;

a temperature controller for controlling the temperature of said water in said at least one vat based upon a predetermined set point temperature;

a timer for timing a rethermalizing operation in said at least one vat;

a water level controller connected to said first sensor, said temperature controller, and said timer for controlling the operation of valve means connected to said at least one vat and to a water supply, wherein said valve means opens to admit water into said at least one vat when (i) said low water level is detected, (ii) said water temperature is within a predetermined range of the set point temperature, and (iii) said at least one vat is not in said active rethermalizing operation.

7. The water level control system of claim 6, wherein said valve means comprises a solenoid valve.

8. The water level control system of claim 6, further comprising at least a second sensor mounted in said vat for detecting a full water level.

9. The water level control system of claim 8, wherein said valve means closes when said full water level is detected to inhibit the flow of water to said vat.

10. The water level control system of claim 6, further comprising at least one heating element connected to and communicating with said temperature controller to heat said water in said vat.

11. The water level control system of claim 10, further comprising at least a third sensor mounted in said vat for detecting a critical low water level, wherein said at least one heating element is disabled when said critical lower water level is detected.

12. A system for designating vat functions and controlling water level in a sous vide rethermalizer comprising:

a sous vide rethermalizer having at least one vat designed for holding and heating water in which sealed pouches of pre-cooked food are heated in preparation for serving;

an input device for entering said function of said at least one vat;

a timing and memory unit connected to said input device for storing set point temperature information, wherein said timing and memory unit selects a set point temperature associated with the vat function entered and detects whether a rethermalizing operation is currently active in said at least one vat;

a temperature controller connected to said timing and memory unit, wherein said temperature controller controls the temperature of said water in said at least one vat in accordance with said vat function selected and determines whether the temperature of the water in said at least one vat is within a predetermined range of said set point temperature;

a first water level sensor in said at least one vat for detecting a low water level;

a second water level sensor in said at least one vat for detecting a full water level; and a water level controller connected to said timing and memory unit, said temperature controller, and said water level sensors for controlling the operation of a water supply, wherein said water supply admits water into said at least one vat when (i) said first water level sensor indicates a low water level condition, (ii) said temperature is within a predetermined range of said set point temperature, and (iii) a rethermalizing operation is not currently active in said at least one vat, until said second water level sensor detects said full water level.

13. The system of claim 12, wherein at least one of said vat functions is designated as a holding function in which a sous vide pouch containing food to be reheated is reheated at a first temperature or as a finishing function in which said sous vide pouch is heated at a second temperature which is higher than said first temperature immediately prior to serving the food contained in said sous vide pouch.

14. The system of claim 12, wherein said water supply is connected to said vat through a valve.

15. The system of claim 12, wherein said input device comprises an alpha-numeric keyboard.

16. The system of claim 12, wherein said first and second water level sensors comprise resistive sensing elements.

17. A sous vide rethermalizer comprising:

a housing containing at least a first vat and a second vat for holding water;

an input device to allow selection of a vat function, said vat function selected from a group of vat functions comprising at least a holding function and a finishing function;

a timing and memory unit that stores information associated with each vat function;

a temperature controller that receives information from said timing and memory unit and controls the temperature of the water in each said vat in accordance with information received from the timing and memory unit;

sensors located in said vats to detect water levels in said vats;

a water level controller that receives information from said sensors and adds water to said vats when said sensors indicate a low water level is detected; and wherein said water level controller further includes means to detect if said finishing function is active in said second vat, and wherein said water level controller prevents the addition of water to said second vat in said finishing function.

\* \* \* \* \*